(12) United States Patent
Campbell et al.

(10) Patent No.: US 10,842,150 B2
(45) Date of Patent: Nov. 24, 2020

(54) **METHOD OF CONTROLLING *FUSARIUM* ON POTATO USING LOWER ALKYL NAPHTHALENE**

(71) Applicant: 1,4Group, Inc., Meridian, ID (US)

(72) Inventors: Michael A. Campbell, Meridian, ID (US); Addie Waxman, Meridian, ID (US); John Forsythe, Meridian, ID (US)

(73) Assignee: 1,4Group, Inc., Meridian, ID (US)

( * ) Notice: Subject to any disclaimer, the term of this patent is extended or adjusted under 35 U.S.C. 154(b) by 0 days.

(21) Appl. No.: 16/396,422

(22) Filed: Apr. 26, 2019

(65) Prior Publication Data
US 2020/0337306 A1    Oct. 29, 2020

Related U.S. Application Data

(60) Provisional application No. 62/663,161, filed on Apr. 26, 2018.

(51) Int. Cl.
*A01N 27/00* (2006.01)
(52) U.S. Cl.
CPC .................... *A01N 27/00* (2013.01)
(58) Field of Classification Search
CPC ...................................... A01N 27/00
See application file for complete search history.

(56) References Cited

U.S. PATENT DOCUMENTS

| | | | | | |
|---|---|---|---|---|---|
| 5,965,489 | A | * | 10/1999 | Forsythe | A01N 47/20 504/143 |
| 6,010,728 | A | * | 1/2000 | Forsythe | A01N 27/00 426/302 |
| 6,310,004 | B1 | * | 10/2001 | Forsythe | A01N 47/20 504/143 |
| 6,375,999 | B1 | * | 4/2002 | Forsythe | A01N 27/00 426/310 |
| 2014/0200137 | A1 | * | 7/2014 | Forsythe | A01N 27/00 504/118 |
| 2014/0200144 | A1 | * | 7/2014 | Campbell | A01N 27/00 504/357 |

FOREIGN PATENT DOCUMENTS

WO    WO 88/08249 A1 * 11/1988 ............. A01N 27/00

OTHER PUBLICATIONS

Manzo-Valencia et al., Journal of Agricultural and Food Chemistry (2016), 64(44), pp. 8315-8323.*

* cited by examiner

*Primary Examiner* — Brian J Davis
(74) *Attorney, Agent, or Firm* — Magleby, Cataxinoz & Greenwood, P.C.

(57) ABSTRACT

A method of controlling *Fusarium* disease on potato, wherein the method comprises contacting potato tuber with a composition comprising lower alkyl naphthalene. The growth of *Fusarium* is controlled by treating the potato tuber with a composition comprising lower alkyl naphthalene.

17 Claims, 5 Drawing Sheets

Specification includes a Sequence Listing.

| Gene | Primer | Sequence | Reference |
|---|---|---|---|
| RPB1 | VH6Fa | CAYAARGARTCYATGATGGGWC | Hofstetter et al. 2007 |
| | G2R | GTCATYTGDGTDGCDGGYTCDCC | Hall, unpubl. |
| RPB2 | 5f2 | GGGGWGAYCAGGAAGAAGGC | Reeb et al. 2004 |
| | 7cr | CCCATRGCTTGYTTRCCCAT | Liu et al. 1999 |
| | 7cf | ATGGGYAARCAAGCYATGGG | Liu et al. 2000 |
| | 11ar | GCRTGGATCTTRTCRTCSACC | Liu et al. 2001 |
| TEF1-alpha | EF1 | ATGGGTAAGGARGACAAGAC | Campbell Personal Communication |
| | EF2 | GGARGTACCAGTSATCATGTT | Campbell Personal Communication |
| ITS | NL1 | GCATATCAATAAGCGGAGGA | Campbell Personal Communication |
| | NL4 | GGTCCGTGTTTCAAGACGG | Campbell Personal Communication |
| | ITS1F | CTTGGTCATTTAGAGGAAGTAA | |
| | ITS2R | GCGTTCTTCATCGATGC | |

FIGURE 2

| Primer | Species | E-value |
|--------|---------|---------|
| ITS | *Fusarium Oxysporum* | $2 \times 10^8$ |
| NL | *Fusarium Oxysporum Sp. lycopersici* | 0.00 |

FIGURE 3

```
                          SEQUENCE LISTING

<160> NUMBER OF SEQ ID NOS: 12

<210> SEQ ID NO 1
<211> LENGTH: 22
<212> TYPE: DNA
<213> ORGANISM: Artificial Sequence
<220> FEATURE:
<223> OTHER INFORMATION: VH6Fa

<400> SEQUENCE: 1
cayaargaar tcyatgatgg wc                                             22

<210> SEQ ID NO 2
<211> LENGTH: 23
<212> TYPE: DNA
<213> ORGANISM: Artificial Sequence
<220> FEATURE:
<223> OTHER INFORMATION: G2R

<400> SEQUENCE: 2
gtcatytgdg tdgcdggytc dcc                                            23

<210> SEQ ID NO 3
<211> LENGTH: 20
<212> TYPE: DNA
<213> ORGANISM: Artificial Sequence
<220> FEATURE:
<223> OTHER INFORMATION: 5f2

<400> SEQUENCE: 3
ggggwgayca ggaagaaggc                                                20

<210> SEQ ID NO 4
<211> LENGTH: 20
<212> TYPE: DNA
<213> ORGANISM: Artificial Sequence
<220> FEATURE:
<223> OTHER INFORMATION: 7cr

<400> SEQUENCE: 4
cccatrgctt gyttrcccat                                                20

<210> SEQ ID NO 5
<211> LENGTH: 20
<212> TYPE: DNA
<213> ORGANISM: Artificial Sequence
<220> FEATURE:
<223> OTHER INFORMATION: 7cf

<400> SEQUENCE: 5
atgggyaarc aagcyatggg                                                20

<210> SEQ ID NO 6
<211> LENGTH: 21
<212> TYPE: DNA
<213> ORGANISM: Artificial Sequence
<220> FEATURE:
<223> OTHER INFORMATION: 11ar

<400> SEQUENCE: 6
gcrtggatct trtcrtcsac c                                              21
```

```
<210> SEQ ID NO 7
<211> LENGTH: 20
<212> TYPE: DNA
<213> ORGANISM: Artificial Sequence
<220> FEATURE:
<223> OTHER INFORMATION: EF1

<400> SEQUENCE: 7
atgggtaagg argacaagac                                                   20

<210> SEQ ID NO 8
<211> LENGTH: 21
<212> TYPE: DNA
<213> ORGANISM: Artificial Sequence
<220> FEATURE:
<223> OTHER INFORMATION: EF2

<400> SEQUENCE: 8
ggargtacca gtsatcatgt t                                                 21

<210> SEQ ID NO 9
<211> LENGTH: 20
<212> TYPE: DNA
<213> ORGANISM: Artificial Sequence
<220> FEATURE:
<223> OTHER INFORMATION: NL1

<400> SEQUENCE: 9
gcatatcaat aagcggagga                                                   20

<210> SEQ ID NO 10
<211> LENGTH: 19
<212> TYPE: DNA
<213> ORGANISM: Artificial Sequence
<220> FEATURE:
<223> OTHER INFORMATION: NL4

<400> SEQUENCE: 10
ggtccgtgtt tcaagacgg                                                    19

<210> SEQ ID NO 11
<211> LENGTH: 22
<212> TYPE: DNA
<213> ORGANISM: Artificial Sequence
<220> FEATURE:
<223> OTHER INFORMATION: ITS1F

<400> SEQUENCE: 11
cttggtcatt tagaggaagt aa                                                22

<210> SEQ ID NO 12
<211> LENGTH: 17
<212> TYPE: DNA
<213> ORGANISM: Artificial Sequence
<220> FEATURE:
<223> OTHER INFORMATION: ITS2R

<400> SEQUENCE: 12
gcgttcttca tcgatgc                                                      17
```

METHOD OF CONTROLLING *FUSARIUM* ON POTATO USING LOWER ALKYL NAPHTHALENE

CROSS-REFERENCE TO RELATED APPLICATION

This application claims the benefit of U.S. Provisional Patent Application No. 62/663,161 filed Apr. 26, 2018, which is incorporated herein in its entirety.

FIELD OF THE DISCLOSURE

Embodiments of the present disclosure relate to methods of controlling *Fusarium* on potatoes. More particularly, this invention relates to methods of controlling *Fusarium* on potatoes using lower naphthalene compounds, such as 1,4-dimethylnaphthalene (1,4-DMN).

BACKGROUND OF THE DISCLOSURE

Potato is the fourth largest agricultural commodity on the world market. *Fusarium* infection on potato has become increasingly widespread in many potato-growing regions, and it often leads to 30-50% yield losses and decreased tuber quality. *Fusarium* is one of the most important yield-limiting diseases in potato production worldwide. *Fusarium* (sometimes referred to as "*fusarium* wilt") can be caused by a complex of *Fusarium* species, including *F. eumartii, F. avenaceum, F. solani, F. graminearum, F. sambucinum*, and *F. oxysporum*.

*Fusarium* spp., for example, naturally thrive in most soils across the globe, making it casual inhabitant of potato tuber's superficial microbiome. Consequently, exposure of tuber flesh to *fusarium* can result in a detrimental vascular disease and can lead to a significant loss in harvest during tuber storage and processing. *Fusarium* spp. can survive for years in field soil, but the primary inoculum is generally borne on tuber surfaces. *Fusarium* spp. infect potatoes via wounds in the periderm inflicted during harvesting or subsequent handling. In stored potatoes, *Fusarium* infection develops most rapidly in high relative humidity (>70%) and at 15° C.–20° C., but continues to advance at the coldest temperatures safe for potatoes.

The high value of the potato crop and the significant economic losses caused by *Fusarium* have led to investigations of various methods to control the disease. However, control of *Fusarium* is difficult due to the limited range of effective fungicides.

E. Gachango et al. report the evaluation of two biocontrol fungicides (*Bacillus subtilis* and *Bacillus pumilus*) and three conventional fungicides (phosphorous acid, azoxystrobin, and hydrogen peroxide) in two storage trials over two years for efficacy in suppressing tuber infection caused by *Fusarium* spp. The biocontrol fungicides had limited control of the storage pathogens compared to the conventional fungicides. Phosphorous acid, hydrogen peroxide, and azoxystrobin were moderately effective in controlling the disease. None of the evaluated fungicides completely controlled the disease. However, the conventional fungicides showed a higher potential for suppressing tuber infection in storage than the biocontrol fungicides. See Gachango E., et al., "*Evaluation and comparison of biocontrol and conventional fungicides for control of postharvest potato tuber diseases*", Biological Control, November 2012, 63(2), 115-120.

F. Ayed et al. report that the treatment of potato tuber with two known fungicides (fludioxonil and quinoline) showed a limited effect in controlling *Fusarium* wilt development. See Fakher Ayed et al., "*Evaluation of fungicides for control of Fusarium wilt of potato*", Plant Pathology Journal, 2006, 5(2), 239-243).

F. Ommati et al. report that *Trichoderma* spp. (antagonistic microorganisms with high activity) showed some control against *Fusarium* ssp. See Ommati F., Zaker M., Mohammadi A., "*Biological control of Fusarium wilt of potato (Fusariumoxysporum f. sp. tuberosi) by Trichoderma isolates under field condition and their effect on yield*", J. Crop Protection, 2013, 2(4), 435-442.

U. S. Publication No. 2011/0047654 discloses the use of antifungal composition comprising natamycin and at least one phosphite containing compound for treating potatoes against fungus selected from of *Mycosphaerella musicola, Mycosphaerella fijensis, Fusarium oxysporum, Alternaria solani*, or *Alternaria alternata*.

U.S. Pat. No. 5,552,315 discloses the use of specific strains of gram-negative bacteria to suppress (i.e., reduce the incidence or severity) fungal-induced potato diseases under storage conditions.

Thiabendazole and 2-aminobutane fungicides have been used to control *Fusarium* by application to potato tubers at harvest or at pre-planting. However, strong concerns are being raised about the potential adverse impact of these chemicals on ground and surface water reservoirs and on the health of agricultural product workers and consumers.

Therefore, there are still need for the methods that are effectively control *Fusarium* disease on potatoes.

BRIEF DESCRIPTION OF THE DRAWINGS

FIG. 2 shows the primers used for amplification of fungal DNA;

FIG. 3 shows the NCBI BLASTn sequence alignments to PCR Products;

DESCRIPTION OF THE DISCLOSURE

Figure 1:
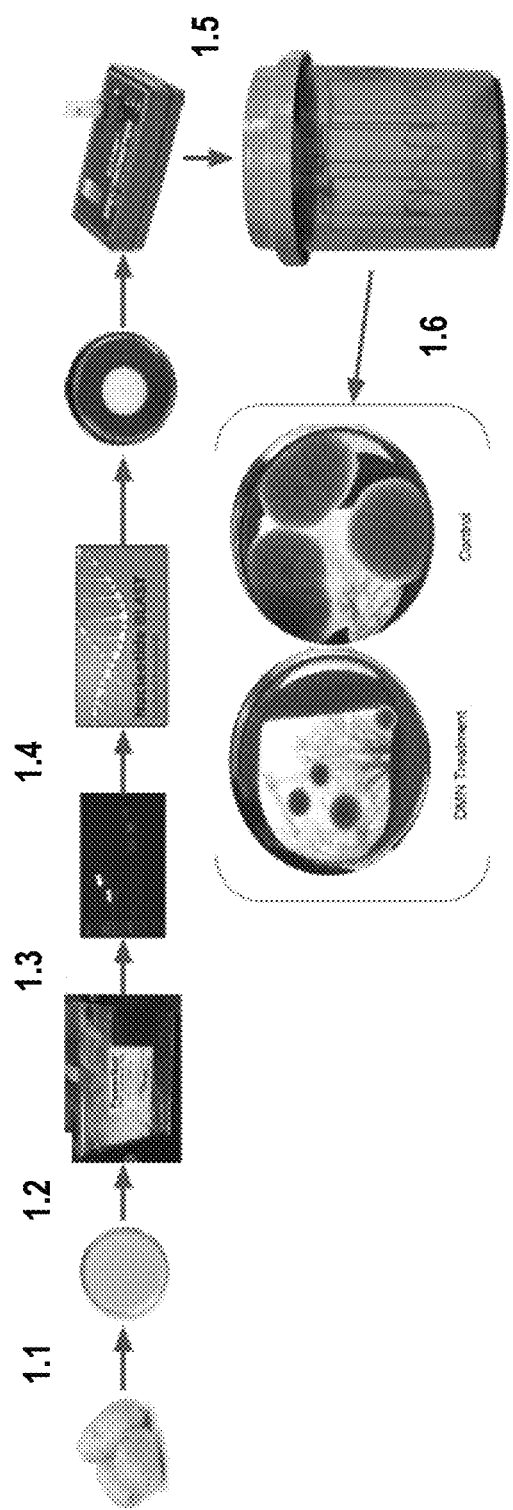
FIG. 1 is a schematic diagram showing the evaluation of 1,4-dimethyl naphthalene (1,4-DMN) for controlling *F. oxysporum* extracted from the surface of potato tubers.

Embodiments of the present disclosure relate to methods of controlling *Fusarium* infections on potato, wherein the methods comprise contacting potato tuber with a composition comprising lower alkyl naphthalene. The potato tuber treated with such composition is less susceptive to *Fusarium* infection as compared to untreated potato tuber. Further embodiments of the present disclosure relate to methods of controlling the growth of *Fusarium oxysporum* on potato tuber, wherein the methods comprise contacting the potato tuber with a composition comprising a lower alkyl naphthalene. The potato tuber may be contacted with a composition comprising lower alkyl naphthalene lower, before or during the storage, during shipment of potato tuber, or prior to planting. The composition comprising lower alkyl naphthalene may be in the form of liquid composition.

The term "lower alkyl naphthalene" as used herein includes a naphthalene compound having at least one C2-C12 alkyl substituents.

The term "alkyl" as used herein includes a linear alkyl group, a branched alkyl group, or a cyclic alkyl group.

Non-limiting examples of lower alkyl naphthalenes suitable for the present disclosure are: dimethyl naphthalene (DMN) such as 1,2-dimethyl naphthalene (1,2-DMN), 1,4-dimethyl naphthalene (1,4-DMN), 1,6-dimethyl naphthalene (1,6-DMN), and diisopropyl naphthalene (DIPN); or trimethyl naphthalene. In some embodiments, the liquid composition may comprise a mixture of various lower alkyl naphthalenes. In some particular embodiments, the lower alkyl naphthalene is dimethyl naphthalene. In other embodiments, the lower alkyl naphthalene is 1,4-dimethyl naphthalene (1,4-DMN), which is a compound naturally abundant in the tissues of dormant potatoes.

It has been known that dimethyl naphthalene (DMN) is suitable as a dormancy enhancer/sprout inhibitor for potatoes in storage or during shipment. DMN also helps the potatoes stay turgid (hydrated). See U.S. Pat. No. 6,010,728.

In some embodiments, the composition comprising DMN (such as 1,4-DMN) can readily be applied to the potato storage units as an aerosol, which forms a vapor and is adsorbed by the stored potatoes.

In some embodiments, the liquid composition comprising DMN (such as 1,4-DMN) may be sprayed on freshly dug potatoes in the field immediately after being dug, during transport from the field, while being conveyed into a storage facility, or immediately after being stored. Once in a storage facility, the potatoes may also be treated with a vapor or mist of DMN (such as 1,4-DMN) either in addition to initial treatments or instead of earlier treatments.

When desired, the liquid composition may further comprise at least one of the following chemicals: adjuvants, solvents/diluents, surfactants, lubricants, odorants, deodorants, fungicides, biocides, or pesticides.

Diluents, depending upon their type and/or aroma characteristics, may be used in varying amounts. Non-limiting examples of suitable diluents may include: C2-C12 alcohols (e.g., methanol, ethanol, isopropyl alcohol, hexanol, octanol, nonanol, decanol and dodecanol, and the like); lower alkyl esters of C6-C10 aliphatic alcohols (e.g., methyl, ethyl or propyl esters of 1-nonanol or 1-hexanol); aliphatic aldehydes; or aliphatic ketones. In some embodiments, the liquid composition comprises a solvent/diluent along with the dimethyl naphthalene (DMN), wherein the ratio of solvent/diluent to DMN is from about 2:1 to about 50:1.

The liquid composition comprising lower alkyl naphthalene may be applied to the potato tuber by various techniques including, but not limited to, the following: immersing the potato tuber in a bath of the liquid composition; spraying the liquid composition to the potato tuber; or applying the liquid composition as a mist over the potato tuber.

In some embodiments, the liquid composition is an aqueous composition. Lower alkyl naphthalene (e.g., DMN) is immiscible with water; however, vigorous agitation may maintain a substantially evenly distributed suspension of lower alkyl naphthalene in water. The mixing may be conducted in a tank as in a mixing chamber of a spray or misting machine. In some embodiments, it is preferred that lower alkyl naphthalene be present at least 5%, although preferably 10%, by volume of the liquid composition.

Treating potato tuber with a composition comprising DMN (such as 1,4-DMN) greatly impacts the microbiome on the surface of potatoes, especially with regards to species diversity. Among the diverse microbiome population is *Fusarium oxysporum*, a particular strain of pathogenic fungus responsible for the *Fusarium* wilt disease. The pathogenic fungus was investigated by DNA sequencing using primers as shown in FIG. 2, SEQ ID 1 corresponds to primer VH6Fa, SEQ ID 2 corresponds to primer G2R, SEQ ID 3 corresponds to primer 5f2, SEQ ID 4 corresponds to primer 7cr, SEQ ID 5 corresponds to primer 7cf, SEQ ID 6 corresponds to primer 11ar, SEQ ID 7 corresponds to primer EF1, SEQ ID 8 corresponds to primer EF2, SEQ ID 9 corresponds to primer NL1, SEQ ID 10 corresponds to primer NL2, SEQ ID 11 corresponds to primer ITS1F, and SEQ ID 12 corresponds to primer ITS2R.

*F. oxysporum* was isolated from the surface of potato tuber using the *Fusarium* selective media Nash-Snider, to which cultures were transferred and maintained on nutritionally complex potato dextrose agar plates. DNA sequencing using selective primers NL1, NL2, ITS1F, and ITS2R confirmed the fungus to be *F. oxysporum*.

A single spore isolation technique was utilized to record the number and growth response of the spores treated with 1,4-DMN in comparison with the spores treated with water (i.e., the Control). Single spore isolate plates were contained in vacuum sealed chambers and incubated at a constant temperature of about 22° C., while exposed to 7.5 µl of 1,4-DMN via aerosol dispersion for four days. After a day of rest, the spores on each plate were measured and counted. As shown in FIG. 1 and Table 1, the *F. oxysporum* spores treated with 1,4-DMN showed slower mycelium diameter growth than the untreated *F. oxysporum* spores (i.e., the Control).

Thus, DMN (such as 1,4-DMN) can be used to control (e.g., reduce the incidence or severity) the growth of *F. oxysporum*, which is an exemplary *Fusarium* species that cause the *Fusarium* disease on potatoes.

Methods

FIG. 1 is a schematic diagram, showing the evaluation of 1,4-DMN for controlling *F. oxysporum* extracted from the surface of potato tuber.

Figure 4:
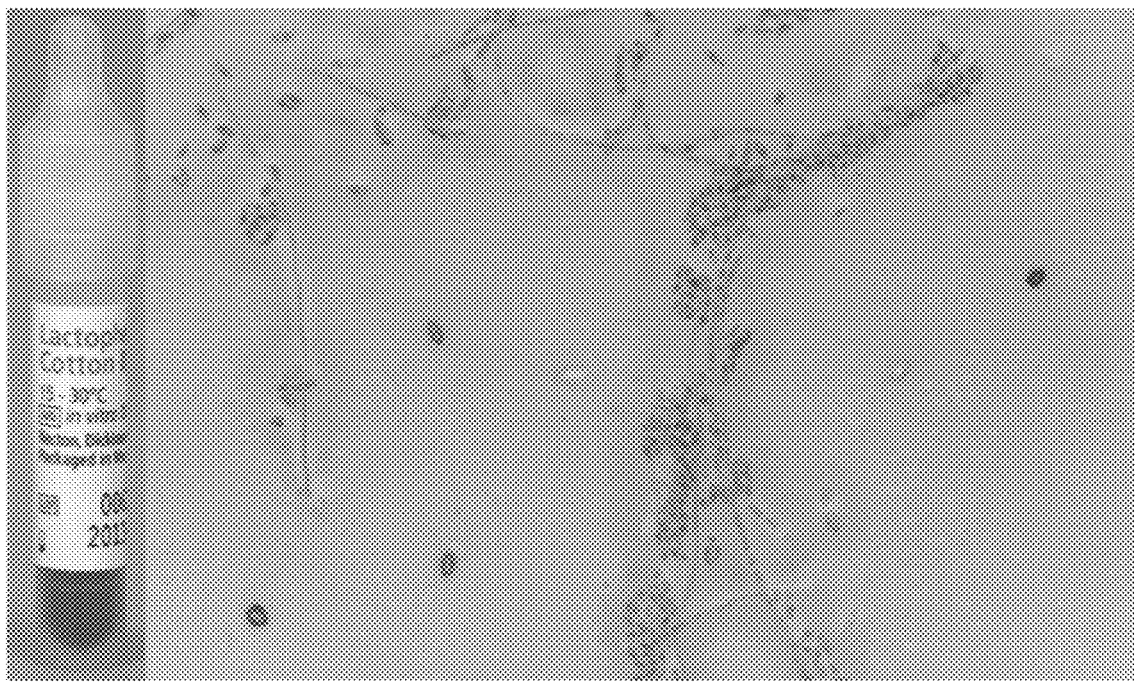
FIG. 4 is the fungal stain using Lactophenol Cotton Blue (1000×)
Figure 5:
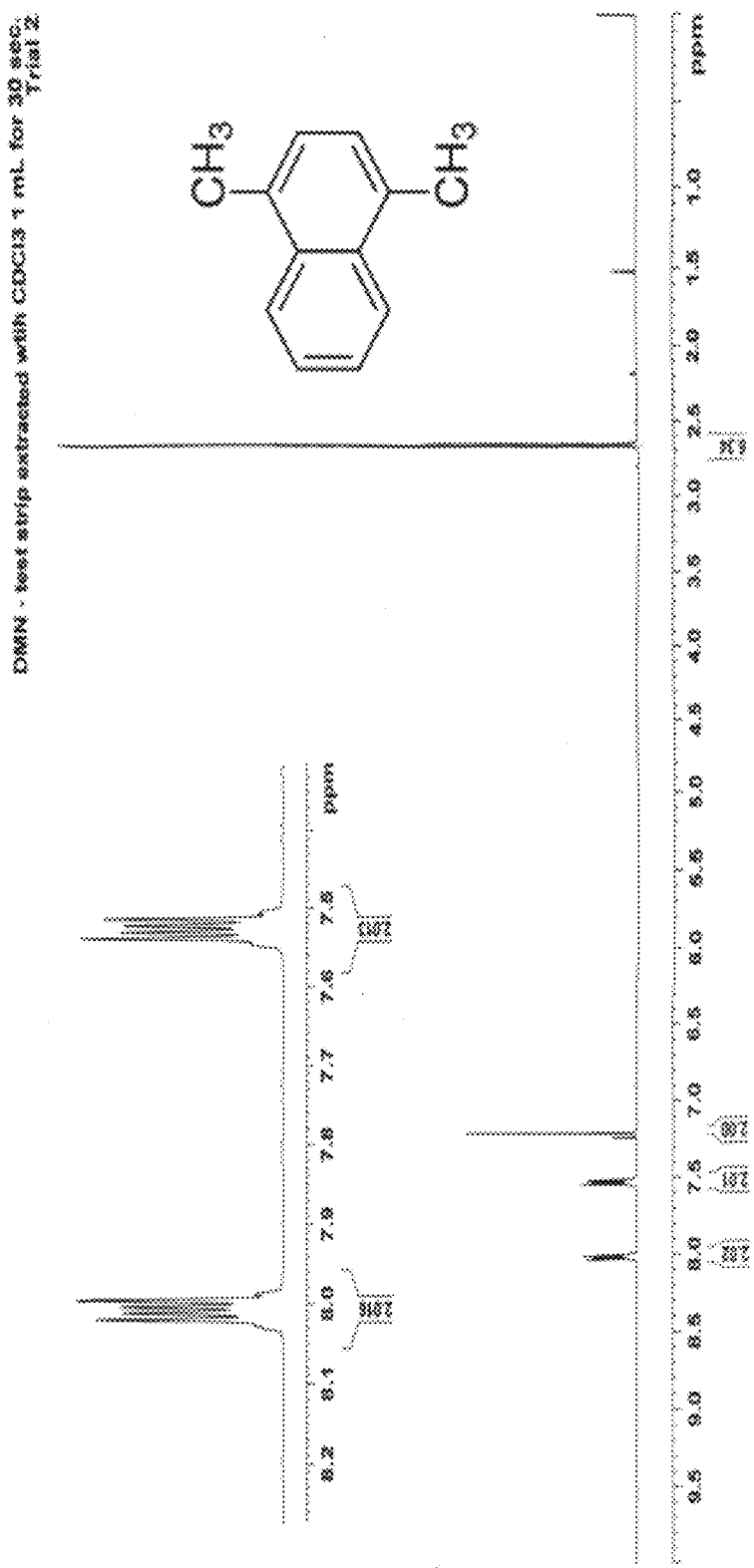
FIG. 5 is the NMR spectrum confirming that the treatment is 1,4-DMN.

Potato skin scrapings were cultured on the *Fusarium* selective media Nash Snider Agar, and later transferred and maintained on nutritionally complex Potato Dextrose Agar (PDA) (Step 1.1 in FIG. 1). DNA isolations were performed on single spore isolates using a Power Soil DNA Isolation Kit (Step 1.2 in FIG. 1). Several primers as shown in FIG. 2 were studied for amplification of Fungal DNA. *Fusarium* selective primers NL1, NL2, ITS1F, and ITS2 allowed PCR amplification of fungal strains genomically similar to *Fusarium*. DNA from samples showed strong PCR product bands via gel electrophoresis (Step 1.3 in FIG. 1). The DNA were sequenced, and the sequence data were analyzed using NCBI BLASTn sequence alignment (Step 1.4 in FIG. 1). FIG. 3 showed NCBI BLASTn Sequence Alignments to PCR Products. The fungal was stained using Lactophenol Cotton Blue (1000×), as shown in FIG. 4. The strain identified as *F. oxysporum* was then subjected to treatments of DMN (7.5 µl) in specialized airtight bins, and incubated at a constant temperature of about 25° C. for four days (Step 1.5 in FIG. 1). FIG. 5 showed the NMR spectrum confirming that the treatment was 1,4-DMN. Then, colony quantity and mycelium diameter were determined (Step 1.6 in FIG. 1).

Table 1 compares the average mycelium diameter and total colonies between Control and DMN Treatment

| Sample | Average Colony mycelium diameter | Average Colonies per Plate | Total Colonies |
| --- | --- | --- | --- |
| Control Sample | 9.89 cm | 4.05 | 162 |
| DMN-treated Sample | 2.94 | 4.125 | 165 |

Thus, *F. oxysporum* successfully isolated from the tuber surface showed inhibition of mycelium growth after exposure to 1,4-DMN for four days.

We claim:

1. A method of controlling *Fusarium* disease on potato, the method comprising contacting potato tuber with a composition comprising lower alkyl naphthalene.

2. The method of claim 1, wherein the lower alkyl naphthalene comprises a dimethyl naphthalene, trimethyl naphthalene, or a combination thereof.

3. The method of claim 1, wherein the dimethyl naphthalene comprises 1,2-dimethyl naphthalenes (1,2-DMN), 1,4-dimethyl naphthalene (1,4-DMN), 1,6-dimethyl naphthalene (1,6-DMN), diisopropyl naphthalene (DIPN), or a mixture thereof.

4. The method of claim 1, wherein the lower alkyl naphthalene comprises 1,4-dimethyl naphthalene.

5. The method of claim 1, wherein the composition comprising lower alkyl naphthalene is a liquid composition.

6. The method of claim 5, wherein the liquid composition further comprises at least one of the following chemicals: adjuvants, diluents, solvents, surfactants, lubricants, odorants, deodorants, fungicides, biocides, or pesticides.

7. The method of claim 6, wherein the diluent comprises at least one of the following: C2-C12 alcohols, alkyl esters of C6-C10 aliphatic alcohols, aliphatic aldehydes, or aliphatic ketones.

8. The method of claim 6, wherein a ratio of the diluent to the lower alkyl naphthalene is from about 2:1 to about 50:1 by volume.

9. The method of claim 5, wherein the liquid composition is an aqueous-based composition.

10. The method of claim 5, wherein an amount of the lower alkyl naphthalene in the liquid composition is at least 5% by volume of the liquid composition.

11. The method of claim 1, wherein the *Fusarium* disease is caused by the *Fusarium* species comprising *Fusarium oxysporum*.

12. The method of claim 1, wherein the potato tuber is contacted with the composition comprising a lower alkyl naphthalene before or during the storage, during shipment of potato tuber, or prior to planting.

13. A method of controlling the growth of *Fusarium oxysporum* on potato tuber, the method comprising contacting the potato tuber with a composition comprising lower alkyl naphthalene.

14. The method of claim 13, wherein the lower alkyl naphthalene comprises a dimethyl naphthalene, trimethyl naphthalene, or a combination thereof.

15. The method of claim 13, wherein the dimethyl naphthalene comprises 1,2-dimethyl naphthalenes (1,2-DMN), 1,4-dimethyl naphthalene (1,4-DMN), 1,6-dimethyl naphthalene (1,6-DMN), diisopropyl naphthalene (DIPN), or a mixture thereof.

16. The method of claim 13, wherein the lower alkyl naphthalene comprises 1,4-dimethyl naphthalene.

17. The method of claim 13, wherein the potato tuber is contacted with the composition comprising lower alkyl naphthalene before or during the storage, during shipment of potato tuber, or prior to planting.

* * * * *